US005382074A

United States Patent [19]
Pietra

[11] Patent Number: 5,382,074
[45] Date of Patent: Jan. 17, 1995

[54] DETACHABLE STROLLER TRAY

[76] Inventor: Barbara M. Pietra, 11368 Homedale St., Los Angeles, Calif. 90049

[21] Appl. No.: 177,345

[22] Filed: Jan. 4, 1994

Related U.S. Application Data

[63] Continuation of Ser. No. 874,544, Apr. 27, 1992, abandoned.

[51] Int. Cl.⁶ ............................................. A47B 39/00
[52] U.S. Cl. ...................................... 297/153; 297/487
[58] Field of Search ................ 297/153, 194, 487, 488, 297/148; 108/25, 43

[56] References Cited

U.S. PATENT DOCUMENTS

| | | | |
|---|---|---|---|
| 3,515,429 | 6/1970 | Bollinger | 297/153 |
| 3,788,699 | 1/1974 | Starr | 297/153 X |
| 4,795,209 | 1/1989 | Quinlan | 297/153 |
| 4,906,043 | 3/1990 | Davis | 297/153 |
| 4,971,389 | 11/1990 | Staggs | 297/174 |
| 5,106,156 | 4/1992 | Marquis | 297/153 |

FOREIGN PATENT DOCUMENTS

| | | | |
|---|---|---|---|
| 33089 | 4/1924 | Denmark | 297/153 |
| 263452 | 12/1926 | United Kingdom | 108/43 |

Primary Examiner—Peter R. Brown

[57] ABSTRACT

A tray which spans between the armrests of a baby stroller is secured in a manner allowing attachment and detachment by use of side straps. The straps are connected to the stroller tray, two straps on each end, through a small slit in the side of the stroller tray. Thus allowing attachment to be achieved by wrapping the straps downward around the side frame rods of the baby stroller. The straps are releasable by pulling the two portions of the straps, which attach to each other, apart manually and thus detaching the stroller from the baby stroller.

2 Claims, 2 Drawing Sheets

DETACHABLE STROLLER TRAY

This application is a continuation, of application Ser. No. 07/874,544, filed Apr. 27, 1992, now abandoned.

BACKGROUND-FIELD OF INVENTION

This invention relates to baby strollers and particularly to an eating and/or playing surface for attachment to such vehicle.

BACKGROUND-DESCRIPTION OF PRIOR ART

Baby strollers have been used internationally for many years. Various attachments have been made to increase the convenience and comfort of both the child riding in the stroller and the person supervising the child. As the design of the baby stroller evolved, the products used for attachment to it have also evolved, e.g. baskets, netting, carrying bags, etc. This present invention is a tremendous step forward in the development of baby stroller attachments, increasing comfort and convenience.

In past years, various trays have been developed for uses being attached by various methods to various baby items. The present invention is the only known tray designed specifically for baby strollers, using a unique method of attachment.

The tray in U.S. Pat. No. 4,795,209 to Quinlan, Apr. 8, 1988 has a limited use. It can be used when attached to a specific size and model baby carrier and is attached by a hinged and snap configuration which is built into this specific carrier. This product cannot be attached to baby strollers as they are made now. Nor can it be used universally because of its limited size, shape and method of attachment.

U.S. Pat. No. 4,906,043 to Davis, Feb. 27, 1989 is strictly limited to baby car seats. Again, its size, shape and tension coil spring method of attachment limit it to a specific baby car seat for which it was designed.

U.S. Pat. No. 4,971,389 to Staggs, Mar. 19, 1990 has a limited use; not including baby strollers. This invention is of a baby tray which can be attached to an adult chair. The method of attachment, unlike the present invention, limits its use to the purpose for which it was designed, specifically, attachment to an adult chair of specific size and configuration. Metal rods and telescoping metal tubes are used to fit and attach it to an adult chair which make it impossible to be used in a baby stroller.

The invention by Starr, U.S. Pat. No. 3,788,699, January 1974, refers to straps being incorporated if the support cushion is to be used by an active infant who may push the cushion out of the "wedged" position which is the main means of securing for this invention. That is, the support cushion designed by Starr is utilized by means of a compression fit: "cushion is wedged between the body of the seat occupant, the arms and the cross piece in a compression fit". My invention rests on the side portions of a baby stroller secured entirely by the VELCRO straps, not needing a cross section piece to secure its fit as is essential in using the invention by Starr.

Starr does not describe the manner in which the straps are attached to either the cushion or the seat. If slits were used in the Starr invention for attaching the straps, they would surely tear the soft foam rubber material of which it is made. Further, the straps used for the invention by Starr are made to be attached at "selected structural components of the seat" whereas my design allows the VELCRO straps to be attached around many various outer structural components (frame rods) of a baby stroller, not the seat.

The Starr design does not provide a deep tray area but rather only a flat surface on which thing can easily slide off. My invention provides a main tray area with sufficient depth to prevent items in the tray from sliding off or being knocked off by a small child.

The Starr invention is a support cushion. My invention is a tray to be used specifically on baby strollers for the purpose of providing the child with an area to play with small toys or hold food. Starr's invention is to support and cushion people who cannot sit upright with assistance, my tray is to be used by small children who are able to sit erect by themselves or leaning against the backrest of the stroller.

The Starr invention surrounds the occupant of the seat on three sides, wide enough to be wedged around the occupant of the seat on both sides and in front of the seat occupant. My invention is designed to be placed only in front of the baby stroller occupant allowing the child to move freely in the seat and not be confined by the design of the tray. Starr's design is intended to do just the opposite, by being compressed between the seat occupant and the surrounding seat structure. The invention by Starr is entirely different from my invention in function, material of which it is composed, attachment design and size and shape of the invention.

The design by Bollinger, U.S. Pat. No. 3,515,429, June 1970, is specifically for use by people in wheelchairs. The VELCRO straps used for attaching this tray to the arms of a wheelchair are "secured by screws or by any other suitable means to the top surface of the tray's arm extension . . . . "In my design the VELCRO straps are specifically attached to the sides of the tray, not the top, by means of a slit in which the straps are secured with a stitch to hold the straps securely in place.

In the Bollinger invention, there is one short VELCRO strap bolted to the top of the r\ tray on each side. In my design, on each side, there are two long straps, sewn together and attached through the slit located on each side of the tray.

Standard baby strollers have a solid piece of fabric stretching between the arm rest of the stroller to the seat on both sides preventing the child from falling out of the stroller, In the Bollinger design, the straps are very short, designed only to go around the armrests of a wheelchair, preventing them from attaching to any place on a baby stroller. The short strap could not go through the fabric sides of a stroller and are not long enough to attach down around the outer side frame rods of a baby stroller. In my invention, the double straps on each side are much longer and are designed to attach around the outside frame rods of a baby stroller allowing its attachment around the outside of the baby strollers' fabric sides.

The Bollinger design has a "flat top and bottom surfaces". "The front and side edges of the main panel portion are covered by a protective strip which may extend slightly above the top surface of the tray to assist in retaining articles placed on the tray surface". In my design, the main tray area is very deep allowing articles to be "set into" the tray, not just on top of a flat surface as in the Bollinger design. The bottom of my invention is consistent with the reverse of the deep upper tray design and is therefore not flat as is the bottom surface of the Bollinger design.

The straps on the Bollinger design and my design are used for very different purposes. The VELCRO straps wrapped around the armrests of a wheelchair in the Bollinger invention keeps the tray from "pivoting forward and downward" where in my invention the use of the velcro straps is to pull downward on the sides of the tray holding the tray taught across the front of a baby stroller.

The Bollinger design is for use on wheelchairs only and is consistent in size with that use, preventing it from being used on baby strollers.

My design and that of Bollinger are very different in size, shape, function, and attachment design.

OBJECTS AND ADVANTAGES

Accordingly, besides the objects and advantages of the detachable stroller tray described in my above patent, several objects and advantages of the present invention are:

1. to provide an eating area for the child while in the baby stroller.
2. to provide a play surface to hold toys and other items for the child's amusement while in the baby stroller.
3. to provide a stroller tray which can be used in most standard baby strollers. Measurements need not be exact to allow attachment because of the unique method used in securing the tray to the stroller.
4. to provide a stroller tray allowing one to convert their child's stroller into a highchair at any time or place. When a highchair is not available or not desirable the stroller tray can be utilized.
5. to provide a secure tight fit of a stroller tray to a baby stroller which can be attached, detached and washed easily.
6. to provide a hygienically safe personal eating surface for the child.

Still further objects and advantages will become apparent from a consideration of the ensuing description and drawings.

SUMMARY OF INVENTION

An attachment to the side frame rod supports of a baby stroller is disclosed herein, which comprises a stroller tray having a deep receptacle tray area, spanning the armrests and straps sufficient in length to reach down around the outside of the baby stroller, attaching around various frame rods, straps which may be released to allow the stroller tray to be lifted up and out being disengaged entirely to separate the stroller tray from the baby stroller. The stroller tray rests on the two armrests of the baby stroller, across the front portion of the seat area in front of the occupant. The straps, made of self attaching fabric material and sufficient in length, each attach to itself allowing attachment of this stroller tray without other devices. Release of the stroller tray may be done manually separating the straps on either side from the side rod supports of the baby stroller.

DETAILED DESCRIPTION OF DRAWINGS

Figure 1:
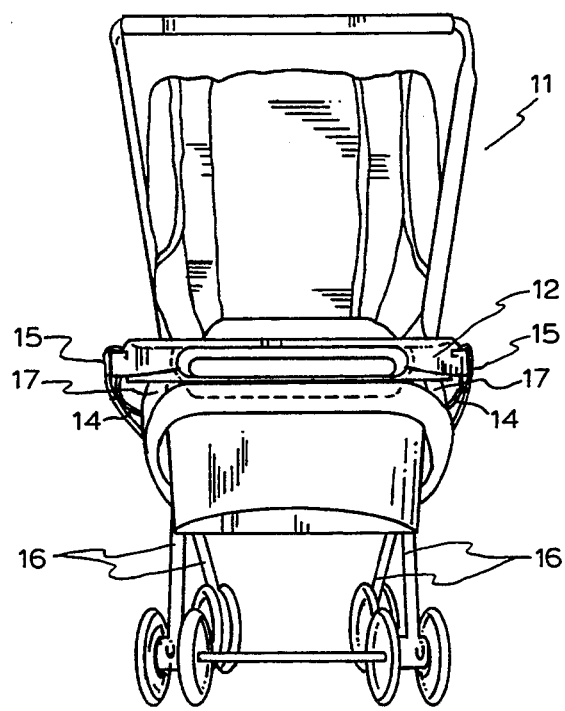
FIG. 1 is a perspective view of an illustrative embodiment of a baby stroller and attached stroller tray, with deep tray area, the tray shown in an attached position on the front portion of the stroller resting between the stroller's armrests and secured by the self sticking straps.

The perspective view of FIG. 1 shows a baby stroller 11 with a stroller tray 12 attached thereto in accordance with the present invention. The baby stroller 11 may be of any of various constructions used for the purpose of self contained mobile transportation of a child. Stroller tray 12 may be used as a table surface from which the child may be fed or on which other items may be placed for the child's entertainment.

The stroller tray consists of a tray having a deep receptacle surface 13 and attached long fabric self sticking side straps 14, 15 on both ends of the stroller tray used to secure the stroller tray 12 on top of side armrests 17 of the baby stroller 10 to any of the outside rods 16 used in frame construction of the baby stroller.

The stroller tray 12 can be removed by manually releasing the side fabric straps 14, 15 which manually attached, hold the stroller tray secured as it rests on the stroller armrests 17.

Figure 2:
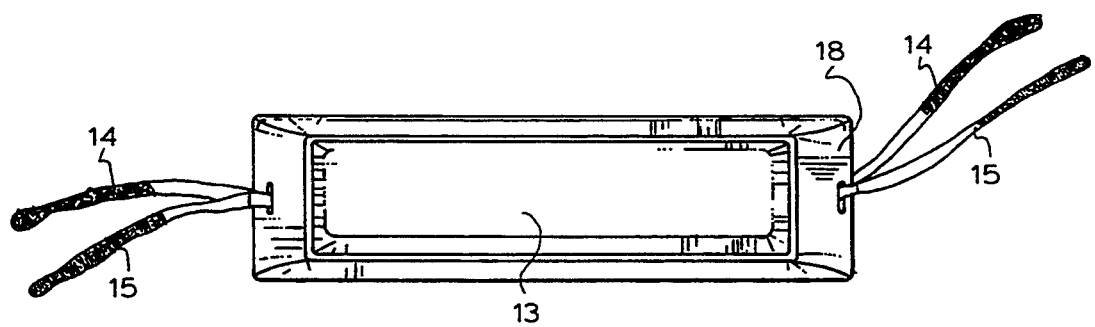
FIG. 2 is a view of the stroller tray separate from the baby stroller showing two long straps sewn together to form one long strap with two long pieces used for attachment to the baby stroller from each side edge of the stroller tray.

FIG. 2 shows a top view of the stroller tray 12 separate from the baby stroller. Self sticking fabric straps 14, 15 are shown extending from both sides of the stroller tray 12. Both said straps are used to attach the stroller tray 12 resting on top of stroller armrests 17 attaching to side rods 16 of any standard baby stroller.

Figure 3:
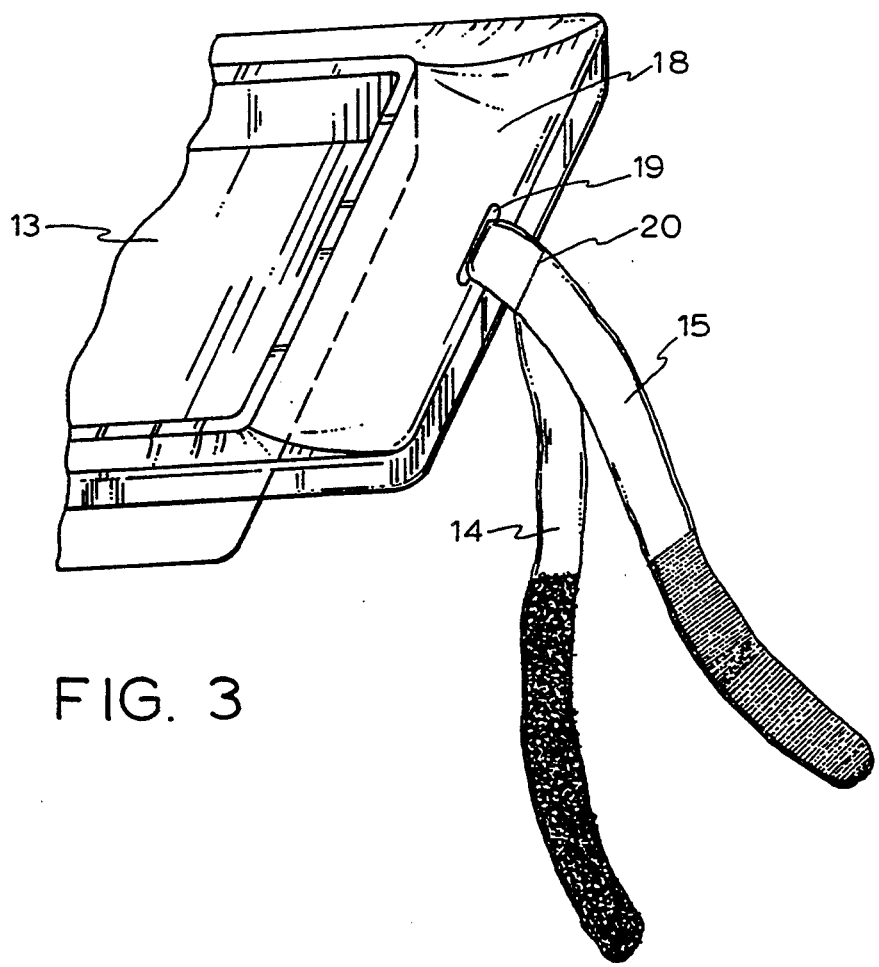
FIG. 3 is a detailed view of a fabric strap from one of the two ends attached to the stroller tray by stitching holding it securely in place on the stroller tray.

FIG. 3 shows a detailed description of one end of the stroller tray 18. The long fabric strap fits through this slit 19 and is secured to the stroller tray 12 by a stitch 20 made to hold it in place on the stroller tray 12.

Figure 4:
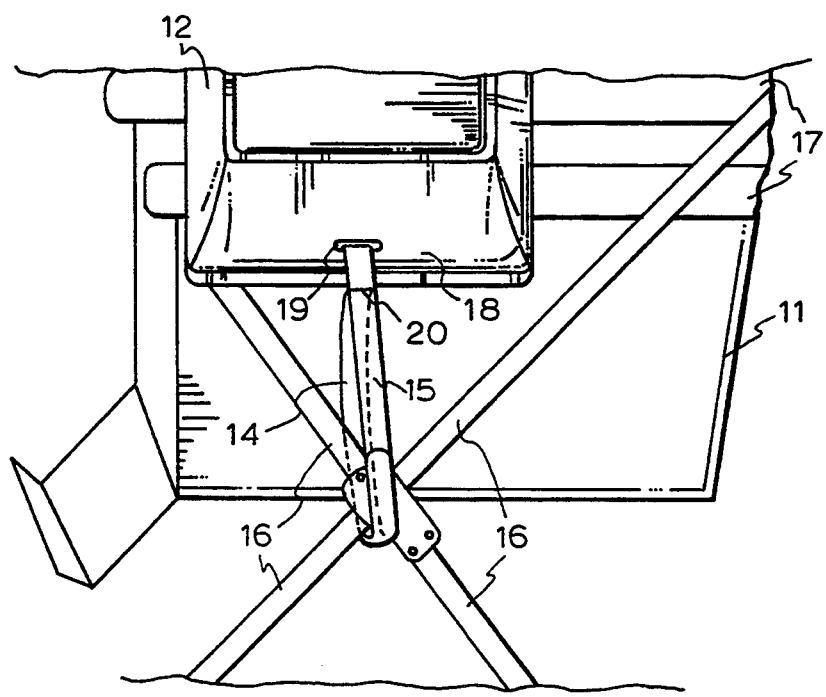
FIG. 4 shows the self sticking strap attached around the side frame of the baby stroller.

FIG. 4 shows the configuration of the two portions of the fabrics 14, 15 being sufficient in length to wrap downward around the side frame rods of the baby stroller 16. The underside portion of the strap 14 goes under or inside and the outer portion of the strap 15 goes on the outside, attaching to the baby stroller frame rods 16. The wrap is complete thus securing the stroller tray 12 as it rests firmly on the armrests 17 of the baby stroller.

The foregoing is shown primarily for purposes of illustration for this present invention. The structural features disclosed herein may be modified somewhat in terms of shape and size while still maintaining the integrity of the present invention as it is intended

I claim:

1. A tray made of firm plastic for attachment to a baby stroller having armrests and side frame rods, the tray having a deep receptacle means located centrally thereof and extending substantially along the lateral extent of the tray for fitting between the armrests of the baby stroller, the tray having a width sufficient to permit the tray to rest upon the armrests of the stroller, the tray further comprising opposed side portion means for extending beyond the armrests of the baby stroller, each side portion means having a side edge and slit formed in each side portion means adjacent to and generally parallel with the side edge; a strap member is located in each slit, each strap member comprised of a single length of material having two ends, said ends each including one complimentary hook-and-loop fastening means thereon for attachment of the ends to one another; said strap members are secured to the tray through the slits, each strap member having a length adequate to allow its attachment around the side frame rods of the baby stroller.

2. A tray, as defined in claim 1, in which each strap member is held in place within said slit by stitching applied to the strap member proximate the slit.

* * * * *